United States Patent
Hammer

(10) Patent No.: US 6,559,941 B1
(45) Date of Patent: May 6, 2003

(54) UV-VIS SPECTROPHOTOMETRY

(75) Inventor: Michael Ron Hammer, Sassafras (AU)

(73) Assignee: Varian Australia Pty. Ltd., Mulgrave (AU)

( * ) Notice: Subject to any disclaimer, the term of this patent is extended or adjusted under 35 U.S.C. 154(b) by 0 days.

(21) Appl. No.: 09/856,660

(22) PCT Filed: Dec. 2, 1999

(86) PCT No.: PCT/AU99/01021
§ 371 (c)(1),
(2), (4) Date: May 22, 2001

(87) PCT Pub. No.: WO00/33039
PCT Pub. Date: Jun. 8, 2000

(30) Foreign Application Priority Data

Dec. 3, 1998 (AU) .............................................. PP7483

(51) Int. Cl.[7] .............................. G01J 3/42; G01J 3/427
(52) U.S. Cl. ....................................................... 356/319
(58) Field of Search .................. 356/319–331

(56) References Cited

U.S. PATENT DOCUMENTS

| 3,431,054 A | * | 3/1969 | Doonan et al. | 356/334 |
| 4,565,447 A | * | 1/1986 | Nelson | 356/319 |
| 4,669,878 A | * | 6/1987 | Meier | 356/319 |
| 5,153,673 A | * | 10/1992 | Amirav | 356/315 |

FOREIGN PATENT DOCUMENTS

EP 840101 A1 * 5/1998 ............. G01J/3/18

* cited by examiner

Primary Examiner—Michael G. Lee
Assistant Examiner—Lisa M. Caputo
(74) Attorney, Agent, or Firm—Edward H. Berkowitz; Bella Fishman

(57) ABSTRACT

An ultraviolet/visible/infrared spectrophotometer, with a pulsed light source (10), has a monochromator with variable slit width to provide variable spectral resolution. The dynamic range at the detectors (24, 28) is reduced by varying the pulse energy emitted by the light source (10) in accordance with the wavelength and slit width settings (34, 36), and/or by varying the slit height in accordance with the slit width. The ligth source (10) may be a xenon flash lamp.

20 Claims, 1 Drawing Sheet

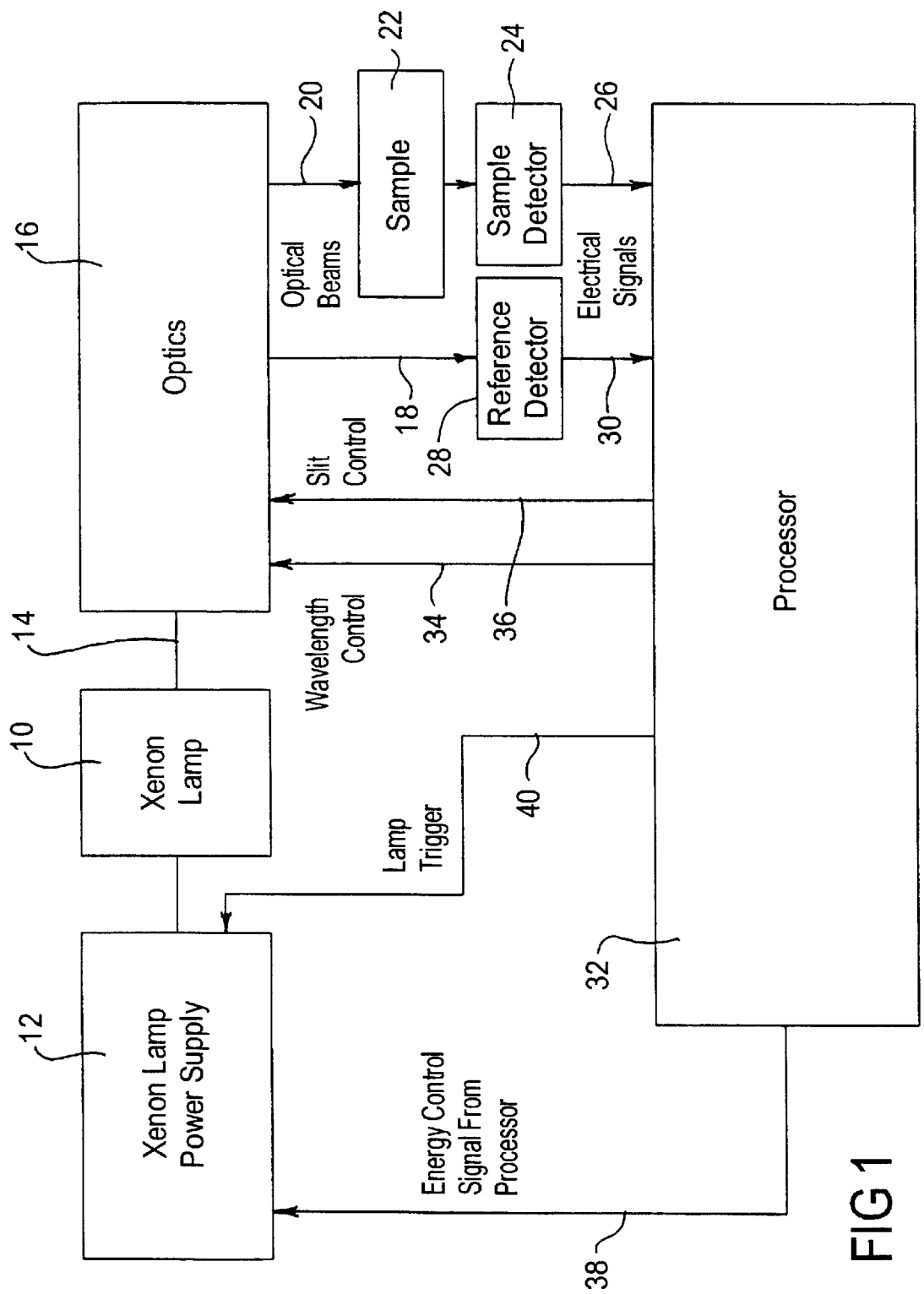

UV-VIS SPECTROPHOTOMETRY

Technical Field

This invention relates to ultraviolet/visible/infrared spectroscopy (UV-VIS) and in particular to a spectrophotometer therefor which offers variable spectral resolution (variable slit bandwidth) in combination with the use of a pulsed light source, for example a xenon flash tube, and solid state detectors. The invention will be described in relation to the use of a xenon flash tube, but it is to be understood other pulsed light sources having similar characteristics may be used.

BACKGROUND

Solid state photosensitive devices (typically silicon) have several advantages as optical detectors for UV-VIS over the more traditional photomultiplier (PM) tubes. Considering specifically the case of silicon

- the useable wavelength range is 190–1100 nm compared to 190–900 nm for photomultiplier (PM) tubes.
- the conversion efficiency of photons to free electrons (photosensitivity) is higher for silicon than for PM tubes and may be, for example, as high as 600 milliamps per watt compared to photomultiplier efficiencies typically peaking at 40 milliamps per watt. This leads to lower system noise levels.
- Silicon detectors exhibit very uniform photosensitivity over their surface. By contrast the photosensitivity of PM tubes varies significantly at different points on the photosensitive cathode.
- Silicon detectors are small and robust. By contrast PM tubes are large and fragile.
- The photosensitive surface of silicon detectors is flat and fully accessible. By contrast the photosensitive surface of PM tubes is located some distance inside an evacuated glass envelope.
- Silicon detectors are cheaper than PM tubes and require less electronics to operate.

For the above reasons, replacement of PM tubes with silicon detectors in UV-VIS instruments is highly desirable and indeed has occurred in lower priced instruments.

It should be noted that solid state detectors are not limited to silicon. Germanium, Gallium Arsenide, Lead Sulphide and many other solid state detectors also exist and much of the above also applies to these devices. These alternative detectors typically cover other wavelength ranges. None the less, silicon is the most commonly used and this invention will be described in terms of this detector type, however it is to be understood that the invention is not limited to the use of a silicon solid state detector.

Xenon flash lamps also have many advantages over conventional continuous emission light sources.

- Optical emission covers the entire wavelength range from below 190 nm to above 1100 nm eliminating the need for two or more light sources plus the attendant optical switching means.
- The xenon light source is far more efficient at converting electrical power into light allowing a significant reduction in power input and heat generation. For example, a quartz halogen light plus deuterium arc lamp combination typically used in conventional UV-VIS instruments together with power supplies typically consumes up to 120 watts of electrical power. Essentially all of this ends up as heat which has to be removed from the instrument. By contrast a xenon flash lamp typically consumes less than 10 watts peak and appropriate system design techniques can reduce the average power consumption even lower (to below 1 watt). Not only does this reduce heat generation, it also makes portable or battery operation feasible.
- Since the xenon flash lamp emits light in a discontinuous fashion compared to the continuous emission of conventional sources it eliminates the need for optical interrupters or choppers simplifying the mechanical construction of the instrument.
- Because the xenon emission is in the form of a very short (typically less than 10 microseconds) and very intense light pulse it allows room light compensation to be made very close in time to the light measurement thus improving the accuracy of such compensation and rendering the instrument substantially less sensitive to room light ingress (typically up to 10,000 times less sensitive).
- Xenon flash lamps have substantially longer life than conventional sources. Depending on the system design, this can be up to 40–80 times as long which substantially adds to overall instrument reliability.

However xenon flash light sources have a substantial disadvantage over conventional light sources. This is that the position and intensity of the arc varies from flash to flash, which has the effect of substantially varying the received optical intensity flash to flash. This variation is effectively optical noise and one technique for overcoming this noise, disclosed in International Application No. PCT/AU97/00603, involves splitting the optical beam into two parts, passing one part through the sample (giving a sample beam), bypassing the sample with the other part (giving a reference beam), simultaneously measuring both the sample and reference beams and ratioing them.

Another problem with xenon flash lamps is that the spatial intensity distribution within the beam also varies. To avoid the effects of this, all parts of the incident beam need to be uniformly split into the sample and reference beams (for example, a split of the left half of the incident beam to the sample and the right half to reference would be unacceptable). It is also necessary that the detectors which are used have uniform photosensitivity over their optical surface. This need for uniform photosensitivity can be met by using solid state (silicon) detectors in place of PM tubes.

The advantages to be gained by the combination of a pulsed light source such as a xenon flash lamp and a solid state detector have been realised by the recent marketing of such an instrument by the applicant. This instrument was introduced to the market as the "Cary 50" in October 1997. Dynamic range problems in this instrument due to variations in light emission, optical throughput and detector sensitivity and spectral bandwidth with wavelength are able to be handled by the use of a fixed slit (i.e. 1.5 nm width) and appropriate selection of optical system components. However the desire to provide a variable slit instrument which retains the advantages of a pulsed light source and solid state detectors presents a dynamic range problem of far greater magnitude than that encountered in the known Varian (fixed slit) instrument. This is because the energy throughput of the optical system is proportional to the square of the slit bandwidth. Thus for a system with slit settings ranging from 0.25 nm to 4 nm using a broadband grating, and for wavelengths from 190 nm to 1100 nm, a dynamic range of about 77000:1 (before sample absorbance is considered) would be required of the detector. For solid state detectors, such a range in light levels cannot be handled by electronic signal processing gain changes whilst maintaining acceptable noise performance (unlike in PM tubes which allow essentially noise free amplification between the photocathode and the anode, the degree of which is controllable by the voltage level applied to the tube). Generally, UV-VIS instruments which offer variable spectral resolution (i.e. variable slit bandwidth) must be able to cope with a much larger dynamic range of light levels compared to fixed slit instruments. Typically, this range is 200–400 times larger.

DISCLOSURE OF THE INVENTION

An object of the present invention is to provide a UV-VIS instrument which utilizes a pulsed light source and solid state detectors and which allows variable spectral resolution.

In a first aspect the invention is characterised by varying the light energy emitted by the pulsed light source on a flash by flash basis. According to this aspect there is provided a spectrophotometer for UV-VIS spectroscopy including:

a pulsed light source for emitting bursts of light, an optical system for directing a beam of each said burst of light to a sample to be analysed, the optical system including a monochromator for selecting the wavelength of said beam, and having a variable slit size, a solid state detector for detecting the intensity of light after interaction of said beam with said sample, and a variable source of electrical power connected to the pulsed light source for varying the energy of each burst of light emitted by the light source for controlling the dynamic measurement range of the spectrophotometer.

Preferably the pulsed light source is a xenon based flash lamp.

Thus the light energy of the source per flash (that is, per burst of light from the lamp) can be manipulated to control the dynamic measurement range of the spectrophotometer in the sense that the actual dynamic range that is presented to the detector for measurement is reduced.

Preferably the light energy is varied in dependence on either or both the wavelength or slit settings which are chosen for a measurement.

This aspect of the invention also provides a method of conducting spectroscopic analysis of a sample including the steps of:

generating bursts of light by a pulsed light source, directing a light beam generated by each burst through the entrance slit of a variable slit bandwidth monochromator to the sample to be analysed, measuring the intensity of said light beam after it has interacted with said sample using a solid state detector, and varying the energy of each burst of light by the pulsed light source to control the dynamic measurement range at the detector.

Preferably the pulsed light source is a xenon based flash lamp.

The light energy emitted by a xenon lamp depends on the electrical power input which is usually derived from charge stored on a capacitor. This charge is dumped into the lamp to generate a flash by a trigger pulse. The charge stored on a capacitor depends on the capacity of the capacitor (C) and the voltage (V) applied thereto and the invention encompasses changing either C or V or both to vary the light energy emitted by the xenon lamp. There are several ways in which the capacitance voltage may be changed. For example, one possibility is to vary the time for which the capacitor is charged from either a fixed current source or a fixed voltage source and series resistor. In the preferred embodiment the voltage is determined via a feedback loop setting the voltage in relation to a voltage reference output from a processor. This establishes more precise control of voltage. Also in the preferred embodiment the feedback loop operates through controlling the output of a DC:DC converter. Lower voltages will in general result in shorter charging times. This allows for increasing the flash rate as the energy per flash is reduced without requiring a larger charging supply or increasing the average dissipation of the lamp. Such an arrangement has the benefit of using regions of greater light throughput to increase data collection rate or reduce noise. It has the disadvantage of increasing the complexity of data collection timing.

A second aspect of the invention is to vary the slit height when changing width. Thus, according to this second aspect, there is provided a spectrophotometer for UV-VIS spectroscopy including:

a pulsed light source for emitting bursts of light, an optical system for directing a beam of each said burst of light to a sample to be analysed, the optical system including a monochromator for selecting the wavelength of said beam, and having a variable slit size, a solid state detector for detecting the intensity of light after interaction of said beam with said sample, and a source of electrical power connected to the pulsed light source for providing electrical energy for each burst of light emitted by the light source, wherein the slit size is variable by varying both the slit width and the slit height such that as width is increased, height is reduced, for controlling the dynamic measurement range of the spectrophotometer. For example, an 8 mm high slit offering 0.5 nm spectral bandpass will have about the same light throughput as a 2 mm high slit offering 1 nm bandpass.

Preferably the pulsed light source is a xenon based flash lamp.

The two aspects of the invention described above may each be used in isolation or jointly to reduce the dynamic range presented to the detector and electronic system.

Other features of the invention are as defined in the claims.

An embodiment of the invention will now be described, by way of non-limiting example only, with reference to the accompanying drawing.

BRIEF DESCRIPTION OF DRAWING

FIG. 1 shows in functional block diagram form an arrangement of parts for an example UV-VIS instrument according to the invention.

DESCRIPTION OF PREFERRED EMBODIMENTS

As shown in FIG. 1 a UV-VIS instrument includes a xenon flash lamp 10 which is powered from a power supply 12. When the xenon lamp 10 generates a flash (which is also herein sometimes termed "a burst of light"), light therefrom (represented by line 14) enters the instrument's optical system represented by block 16. Generally this optical system includes a monochromator having a variable entrance slit and a variable exit slit, and a beam splitter for deriving a reference beam, represented by line 18, and a sample beam, represented by line 20, from a beam which exits the monochromator. The sample beam 20 is passed through a sample 22 and the residue thereof detected by a sample detector 24 from which an electrical measurement signal 26 is passed to a processor 32. The reference beam 18 passes to a reference detector 28 from which an electrical measurement signal 30 is passed to the processor 32. The sample and reference detectors 24 and 28, respectively, are solid state detectors, preferably of silicon.

The above mentioned International Application PCT/AU97/00603 discloses a system similar to that just described and how the measurement and reference signals are processed. Reference should be made to this disclosure for further information on such processing.

Processor 32 also provides wavelength and slit control signals, 34 and 36 respectively, to the optics 16, and an energy control signal 38 to the power supply 12 for the xenon lamp. The energy throughput of the monochromator is inversely proportional to the square of the slit setting (double the slit width increases light throughput 4 times). It also depends on the wavelength in a complex way dependent on the lamp emission profile, grating efficiency and detector efficiency. This means that energy compensation for changes in the slit setting can be readily computed and applied via control signal 38. A simple implementation may rely on only compensating for slit variation making no compensation for changes in throughput with wavelength. This would offer significant advantage over a fixed energy flash but not as much as compensating for both slit and wavelength. Adding compensation for wavelength can be achieved for example either via an approximate preprogrammed relationship (determined for example by experimental measurements on one or more units) or more accurately by measuring the variation in throughput with wavelength by a calibration scan, or a combination of the two techniques using a preprogrammed relationship as a starting point and refining it via a calibration scan. The processor 32 also controls a lamp trigger pulse signal 40 to the power supply 12 for initiating the dumping of the energy stored by supply 12 into lamp 10.

The amount of light energy per flash that is passed into the optics 16 of the instrument is controlled by varying the light energy emitted by the xenon lamp 10 and this in turn is controlled by the wavelength and slit settings. Thus the dynamic measurement range required of the instrument is controllable to, within an acceptable range for the silicon detectors 24 and 28. For example, a 250:1 change in lamp output can reduce the dynamic range from about 76000:1 to about 270:1. The variation in lamp energy is effectively a noise free change in system gain and achieves the same result as a change in photomultiplier tube gain via changing the EHT voltage.

The power supply 12 may include a capacitor which is charged from a DC source via a DC/DC converter, which may be a flyback or other type of converter. By controlling a reference voltage input to such a converter, the final steady state output voltage of the converter and thus the charge on the capacitor is determinable on a flash-by-flash basis. Thus the energy of each flash may be controlled. For example, varying the capacitor voltage between 200 volts and 1000 volts gives a 25:1 change in lamp flash energy.

To achieve control over a greater range than allowable by voltage control alone, the power supply 12 may additionally include means to control the capacitance. Such control may involve using two or more capacitors in parallel and switching one or more of these into or out of the circuit with either a solid state or mechanical relay. For example, using 2 capacitors with a 9:1 ratio of capacitance and switching the larger achieves a 10:1 change in flash energy. This, used in conjunction with variation of charging voltage, gives an overall adjustment range of 250:1 within the time from one flash to the next.

In practice, the maximum electrical input to xenon flash tubes is limited—typically to about 100–300 mJ. As xenon tubes are usually run at near their maximum rated energy input, much of the increased dynamic range will be achieved by reducing the energy per flash rather than by increasing it. This means that it is also necessary to increase the overall system throughput to compensate. Such an increase may be achieved in a variety of ways such as:

use of higher slits (for example, a 0.75 mm slit could be increased to 8 mm). Throughput is linearly dependent on slit height.

use of larger optical components—this reduces F number and thus increases light throughput.

imaging the beam down onto smaller detectors. This increases the energy density on the detector and gives lower noise output for the same signal level.

A further aspect of the invention which may be used to assist in alleviating the dynamic range problem is to use different slit heights for different slit widths. For example, a 1.5 nm slit 0.75 mm high has almost the same throughput as a 0.5 nm slit 6.75 mm high. This could be particularly applicable to an instrument which say used a tall narrow slit for high precision analysis using conventional cuvettes but a wider shorter slit for optical fibre work where poorer spectral resolution is often acceptable. Ideally this latter slit could be round instead of rectangular allowing optimal matching to optical fibres.

The slit widths in optics 16 may be continuously variable for example from 0.2 to 4 nm. Alternatively, a number of fixed width slits (for example, 0.25, 0.5, 1, 2, 4 nm) may be used. This may utilise a slit drive stepper motor driving a single etched slit disc incorporating all the slit apertures.

The invention described herein is susceptible to variations, modifications and/or additions other than those specifically described and it is to be understood that the invention includes all such variations, modifications and/or additions which fall within the scope of the following claims.

What is claimed is:

1. A spectrophotometer for UV-VIS spectroscopy including:

a pulsed light source for emitting bursts of light, an optical system for directing a beam of each said burst of light to a sample to be analysed, the optical system including a monochromator for selecting the wavelength of said beam, and having a variable slit size, a solid state detector for detecting the intensity of light after interaction of said beam with said sample, and a variable source of electrical power connected to the pulsed light source for varying the energy of each burst of light emitted by the light source for controlling the dynamic measurement range of the spectrophotometer.

2. A spectrometer as claimed in claim 1 wherein the pulsed light source is a xenon lamp.

3. A spectrophotometer as claimed in claim 2 wherein the variable source of electrical power includes means for storing an electrical charge for discharge through the xenon lamp for emission of a burst of light, the amount of stored charge being variable in dependence upon a control signal supplied to the electrical power source, the control signal being derived from the slit size setting of the monochromator.

4. A spectrophotometer as claimed in claim 2 wherein the variable source of electrical power includes means for storing an electrical charge for discharge through the xenon lamp for emission of a burst of light, the amount of stored charge being variable in dependence upon a control signal supplied to the electrical power source, the control signal being derived from the wavelength setting of the monochromator.

5. A spectrophotometer as claimed in claim 2 wherein the variable source of electrical power includes means for storing an electrical charge for discharge through the xenon lamp for emission of a burst of light, the amount of stored charge being variable in dependence upon a control signal supplied to the source, the control signal being derived from both the slit size and wavelength settings of the monochromator.

6. A spectrophotometer according to any one of claims 3 to 5, wherein the means included in the variable power source is a capacitor network, and wherein the control signal is operative to vary the capacitance of the capacitor network.

7. A spectrophotometer according to any one of claims 3 to 5 wherein the means included in the variable power source is at least one capacitor, and wherein the control signal is operative to vary a charging voltage applied to the capacitor.

8. A spectrophotometer according to any one of claims 3 to 5 wherein the means included in the variable power source is at least one capacitor, and wherein the control signal is operative to vary the time period for which the capacitor is charged from a fixed voltage source or a fixed current source.

9. A spectrophotometer according to any one of claims 3 to 5 including a processor for supplying a wavelength control signal and a slit size control signal to the monochromator, and wherein the processor supplies the control signal to the variable source of electrical power and also a pulse signal to trigger the discharge of the stored electrical charge through the xenon lamp, wherein the control signal to the variable source of power is derived from either or both of the wavelength and slit size control signals according to a predetermined relationship.

10. A spectrophotometer according to claim 9 wherein the predetermined relationship is a pre-programmed relationship.

11. A spectrophotometer according to claim 9 wherein the predetermined relationship is determined from a calibration procedure.

12. A spectrophotometer according to claim 1 wherein the slit size is variable by varying both the slit width and the slit height such that as width is increased, height is reduced, for further controlling the dynamic measurement range of the spectrophotometer.

13. A spectrophotometer according to claim 1 wherein the solid state detector is a silicon detector.

14. A spectrophotometer for UV-VIS spectroscopy including:
   a pulsed light source for emitting bursts of light,
   an optical system for directing a beam of each said burst of light to a sample to be analysed, the optical system including a monochromator for selecting the wavelength of said beam, and having a variable slit size,
   a solid state detector for detecting the intensity of light after interaction of said beam with said sample,
   and a source of electrical power connected to the pulsed light source for providing electrical energy for each burst of light emitted by the light source,
   wherein the slit size is variable by varying both the slit width and the slit height such that as width is increased, height is reduced, for controlling the dynamic measurement range of the spectrophotometer.

15. A spectrophotometer according to claim 14 wherein the pulsed light source is a xenon lamp.

16. A method of conducting spectroscopic analysis of a sample including the steps of:
   generating bursts of light by a pulsed light source,
   directing a light beam generated by each burst through the entrance slit of a variable slit bandwidth monochromator to the sample to be analysed,
   measuring the intensity of said light beam after it has interacted with said sample using a solid state detector, and
   varying the energy of each burst of light by the pulsed light source to control the dynamic measurement range at the detector.

17. A spectrophotometer as claimed in claim 16 wherein the pulsed light source is a xenon lamp.

18. A method as claimed in claim 16 or 17 including varying the entrance slit width between successive bursts of light arid varying the energy of each burst of light in dependence upon the slit width.

19. A method as claimed in claim 16 including adjusting the monochromator between successive bursts of light to select a wavelength for each beam directed to the sample,
   and varying the energy of successive bursts of light in dependence upon the wavelength setting.

20. A method as claimed in claim 16 including varying both the entrance slit width and the slit height between successive burst of light such that as slit width is increased, slit height is reduced, and vice versa.

* * * * *